Oct. 8, 1940.                R. J. COOK                2,216,766
                      COLLOCATING INSTRUMENT
                        Filed June 18, 1940
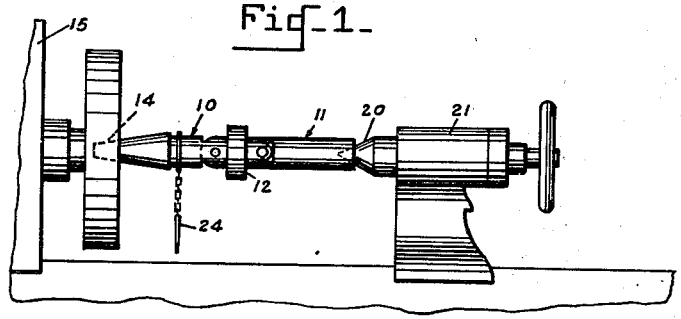
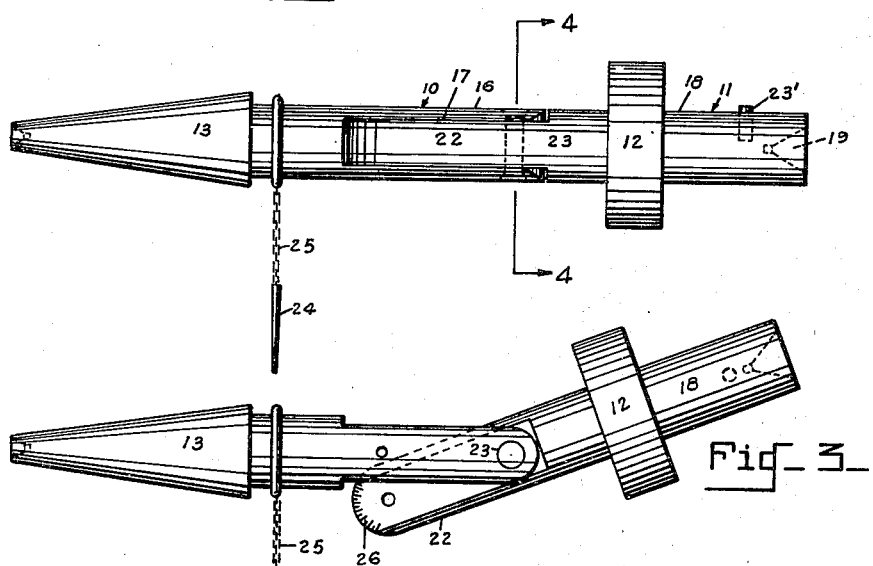
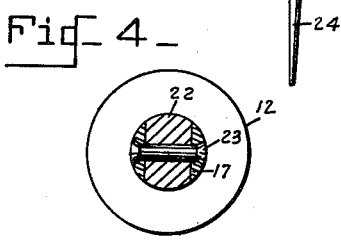
Inventor
Robert J. Cook
By: *Kessenich and Church*
Attorneys Patented Oct. 8, 1940

2,216,766

UNITED STATES PATENT OFFICE 2,216,766

COLLOCATING INSTRUMENT

Robert J. Cook, Fort Sill, Okla.

Application June 18, 1940, Serial No. 341,161

4 Claims. (Cl. 33—181)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an instrument or gage adapted for use in aligning the centers of machine tools, such for example as the head and tail stock centers of a lathe.

It is an object of the invention to provide a gage of simple and rugged construction, capable of functioning within limits of a high degree of accuracy, and adapted to facile collocation of machine tool centers in true alignment or predetermined offset relation.

The specific nature of the invention as well as other objects and advantages thereof will clearly appear from a description of a preferred embodiment as shown in the accompanying drawing in which:

Fig. 1 is a fragmentary elevational view of a machine tool, for example a lathe, showing the gage in true alignment position between the tool centers.

Fig. 2 is a plan view of the gage shown in Fig. 1 on an enlarged scale.

Fig. 3 is an elevational view of the gage adjusted to set the centers of a machine tool on predetermined offset axes.

Fig. 4 is a sectional view taken on the line 4—4 of Fig. 2.

Referring now to the drawing by characters of reference it will be seen that the instrument or gage of this invention comprises essentially three main parts generally indicated at 10, 11 and 12, respectively.

The part 10 is formed with a conically shaped head portion 13 adapted to be received within the conically recessed center 14 of the head stock 15 of a lathe or similar tool in axial prolongation of the center and has a body portion 16 of circular section projecting axially of the head portion from the base end of the latter, on a diameter less than the diameter of the base of the conical head portion. The end portion of the body 16 is symmetrically bifurcated as indicated at 17 for a purpose hereinafter made apparent.

The part 11 comprises a member 18 of circular section of the same diameter as the body portion 16 of part 10. One end portion of the member 18 is conically recessed axially of the member as indicated at 19 to fit upon the center 20 of the tail stock 21 in axial prolongation, and the other end of the member is formed as indicated at 22 to be pivotally received between the bifurcations of the bifurcated end portion 17 of body 16 in such manner that when the axes of the parts 10 and 11 are in alignment with each other the portion 16 and member 18 will form a substantially cylindrical surface from one end to the other as shown in Figs. 2 and 4. Parts 10 and 11 are pivotally secured to each other by the transverse pivot pin 23 and to facilitate pivotal movement of the parts the free ends of the bifurcations and portion 22 may be formed on a suitable radius as shown.

Part 12 is a collar bored on a diameter permitting sliding movement thereof through minimum tolerance over the parts 10 and 11 when disposed as shown in Figs. 1 and 2 and is retained on the assembled parts 10 and 11 by the retaining pin 23' at one end and the base of the conical head portion 13 at the other end. If desired the collar 12 may be knurled to provide for ready manipulation thereof.

For the purpose of maintaining the gage in extended position as shown in Fig. 2 when the same is not in use and thereby reducing likelihood of damage thereto a pin 24 is provided which may be inserted through aligned transverse apertures in the bifurcations of body portion 16 and portion 22 of member 18. The pin 24 may be retained permanently with the part 10 as by the chain 25 secured in any suitable manner to the body portion 16.

As indicated at 26 in Fig. 3 one side of the portion 22 of member 18 may be graduated in degrees or other suitable units of angular measure readable against the upper or lower edge of the adjacent bifurcation of body portion 16 of member 10 and indicating the angular displacement of the axis of part 10 with respect to the axis of part 11. If desired the opposite side of the gage may be provided with a scale similar to the scale 26 reading in linear units of taper for use with a tool, such as a lathe, when it is desired to arrange the centers in such manner that the stock held in the centers will be machined on a taper.

In the fabrication of the gage of this invention I have found it convenient to machine parts 10 and 11 so that the head portion of part 10 and recessed portion 19 of part 11 will be finished and the two parts adapted for pivotal connection as shown in the drawing. Parts 10 and 11 are then pivotally connected by the pivot pin and temporarily secured in the distended position of Fig. 2 by a transverse pin inserted in the apertures for pin 24. The body portion 16 of part 10 and member 18 are then machined to within .015 inch of finished dimensions and properly surface hardened after which the assembly is ground to the finish dimensions of a true cylinder. The part 12 properly hardened and with its bored surface adjusted from .0001 to .0003 inch larger than the diameter of the aforementioned cylindrical surface is then assembled on the parts 10 and 11 and the pin 23' affixed on part 11. The temporary pin is removed and pin 24 affixed to part 10 and the gage is now in condition for use.

In operation the gage is placed in a lathe or similar tool as shown in Fig. 1 with the pivot pin thereof placed horizontally. The stock is then adjusted vertically until the part 12 is freely translatable over the body of the gage indicating that the axes of the parts 10 and 11 of the gage are in alignment and the tail stock center in horizontal alignment with the axis of the head stock center. The gage is then rotated 90° to place the hinge or pivot pin thereof vertically and the tail stock adjusted horizontally until part 12 is freely translatable over the body of the gage at which time the tail stock center will be in vertical alignment with the head stock center and in axial prolongation of the head stock center axis. If it is desired to offset the tail stock center to machine a taper the gage may be adjusted accordingly and the tail stock center set in accordance therewith.

In using the gage it will be apparent to those acquainted with the art that if the tail stock center is not in alignment with the head stock center that part 11 will pivot about the hinge pin connecting parts 10 and 11 thus causing a break in the cylindrical body of the gage and preventing translation of the part 12.

I claim:

1. In a collocating instrument, a part comprising a head portion adapted to receive a machine tool center and a body portion projecting axially of the head portion, a second part adapted at one end to receive a second center of said machine tool, said second part being formed at its end portion remote from said one end to be pivotally secured to the first recited part for axial pivotal movement about the axis of said first recited part and shaped to form a continuation of the body portion thereof when disposed in axial prolongation of said first recited part, means pivotally connecting said parts together for relative pivotal movement as recited, and a collar fitted within close tolerances on the body portions of said parts for sliding movement therealong.

2. In a collocating instrument, a part comprising a conically shaped head portion adapted to be received within a correspondingly shaped recessed machine tool center and a cylindrical body portion projecting axially from the base of the head portion, a second part of cylindrical section of the same diameter as the body portion of said first recited part recessed on one end portion to receive a second center of said machine tool and having means at its opposite end adapting it for axial pivotal movement about the axis of the body portion of said first recited part, means pivotally connecting said parts for relative axial pivotal movement, and a collar fitted within close tolerances on the body portions of said parts for sliding movement therealong.

3. In a collocating instrument, a part comprising a conically shaped head and cylindrical body portion extending axially from the base of the head, said body portion being axially bifurcated symmetrically through its end portion remote from the head, a second part comprising a portion of cylindrical section of the same diameter as said body portion recessed axially from one end and provided with a portion projecting axially from its opposite end adapted to fit within the bifurcated end portion of said body portion for pivotal movement, said projecting portion forming a substantial continuation of the surface of said cylindrical body portion throughout the bifurcation when in axial alignment with the body portion, a pivot pin securing said parts in pivotal relation passing transversely through the axes of the outer portion of the bifurcations and inner portion of such projecting portion, a collar fitted within close tolerances on the body portions of said parts for sliding movement therealong, and a pin in said second part adapted to limit sliding movement of the collar thereon.

4. The structure of claim 3 wherein a scale is inscribed upon a face of said projecting portion readable against an edge of one of the bifurcations.

ROBERT J. COOK.